United States Patent
Young

(10) Patent No.: US 7,984,226 B2
(45) Date of Patent: Jul. 19, 2011

(54) METHOD FOR SENSING AND AUTO SWITCHING BETWEEN TWO USB INPUT PORTS TO A SINGLE PORT ON THE PDA

(75) Inventor: Timothy Young, Clover, SC (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 91 days.

(21) Appl. No.: 12/482,035

(22) Filed: Jun. 10, 2009

(65) Prior Publication Data
US 2010/0318715 A1     Dec. 16, 2010

(51) Int. Cl.
G06F 13/20 (2006.01)
G06F 3/00 (2006.01)
G06F 13/36 (2006.01)
G06K 7/10 (2006.01)

(52) U.S. Cl. .............. 710/313; 710/17; 710/18; 710/62; 710/63; 710/305; 710/314; 710/315; 235/462.01; 713/401

(58) Field of Classification Search ................ 710/17, 710/18, 62, 63, 305
See application file for complete search history.

(56) References Cited

U.S. PATENT DOCUMENTS

| 6,633,921 | B1 | 10/2003 | Pan |
| 6,657,889 | B1 * | 12/2003 | Subramanian et al. ....... 365/158 |
| 6,976,626 | B2 * | 12/2005 | Schmidt et al. .......... 235/462.01 |
| 7,502,878 | B1 * | 3/2009 | Wright ............................. 710/37 |
| 7,764,784 | B2 * | 7/2010 | Sewall ..................... 379/428.02 |
| 2001/0032280 | A1 | 10/2001 | Osakada et al. |
| 2007/0245058 | A1 | 10/2007 | Wurzburg et al. |

FOREIGN PATENT DOCUMENTS

GB         2352540 A        3/2001

OTHER PUBLICATIONS

European Search Report of corresponding EP application No. 10165453.1-2212, dated Sep. 15, 2010, total 7 pgs.
SMSC—Success by Design, Product Datasheet, USB MultiSwitch Hub USB 2524, Revision 1.91 (Aug. 22, 2007) total 57 pgs.
CradlePoint, Inc., Cradlepoint Technology, User Guide for PS6U1UHE, USB-Host to Ethernet Adapter, 16 pgs.

* cited by examiner

*Primary Examiner* — Brian T Misiura
(74) *Attorney, Agent, or Firm* — Hiscock & Barclay, LLP

(57) ABSTRACT

Routing circuitry for automatically routing either a first set of USB signals derived from an Ethernet local area network (LAN) at an Ethernet connector or a second set of USB signals derived from a USB host at a USB connector to an output connector which can interface with a data processing device.

8 Claims, 5 Drawing Sheets

METHOD FOR SENSING AND AUTO SWITCHING BETWEEN TWO USB INPUT PORTS TO A SINGLE PORT ON THE PDA

FIELD OF THE INVENTION

The present invention relates to switching between two data ports, and more particularly, to automatically selecting one of two USB ports to connect to a third USB port.

BACKGROUND OF THE INVENTION

A portable data device (PDT) is one of many types of mobile data terminals (MDTs) that periodically communicate with host devices, such as computers. Generally these MDTs use wired connections, the most common of which are USB connections and connections over a local area network (LAN) such as an Ethernet LAN. Suppliers of mobile data terminals often supply docking cradles which hold the MDTs and have one or more data jacks for plugging in the wired data connections and power jacks or cables with wall plugs to recharge the batteries in the MDTs.

To accommodate the different data protocols, the docking cradles have two or more data input/output jacks and conventionally have a switch so that a user can manually select which jack to use to connect to the MDT.

SUMMARY OF THE INVENTION

The invention comprises, in one form thereof, Routing circuitry for automatically routing either a first set of USB signals derived from an Ethernet local area network (LAN) at an Ethernet connector or a second set of USB signals derived from a USB host at a USB connector to an output connector which can interface with a data processing device includes USB supply voltage selection circuitry that passes a USB supply voltage from the first set of USB signals, or the second set of USB signals, or isolates the USB supply voltages from the first and second set of USB signals from the output connector in response to two or more first input signals, USB data selection circuitry that passes USB data signals from the first set of USB signals or the second set of USB signals to the output connector in response to one or more second input signals, and USB supply voltage detection circuitry that detects if the USB supply voltage from the second set of USB signals is present, and generates the two or more first input signals and the one or more second input signals in response to the detection, wherein the USB supply voltage detection circuitry generates a first set of first input signals which isolates the USB supply voltages from the first and second set of USB signals from the output connector when there is a change in the USB supply voltage from the second set of USB signals, and later generates a second set of first input signals to pass the USB data signals from the first set of USB signals or the second set of USB signals to the output connector.

In still another form, the invention includes a method for automatically routing either a first set of USB signals derived from an Ethernet local area network (LAN) or a second set of USB signals derived from a USB host to a connector which can interface with a data processing device. The method comprises the steps of coupling the USB signals from the first set of USB signals to the connector if there is not a USB supply voltage from a USB host, coupling the USB signals from the second set of USB signals to the connector if there is a USB supply voltage from a USB host, and if the USB supply voltage derived from the USB host changes from not being present to being present, or from being present to not being present, interrupting the USB supply voltage to the connector for a period of time after the change and later applying the USB supply voltage from one of the first and second set of USB signals to the connector.

BRIEF DESCRIPTION OF THE DRAWINGS

The aforementioned and other features, characteristics, advantages, and the invention in general will be better understood from the following more detailed description taken in conjunction with the accompanying drawings, in which.

Figure 1:
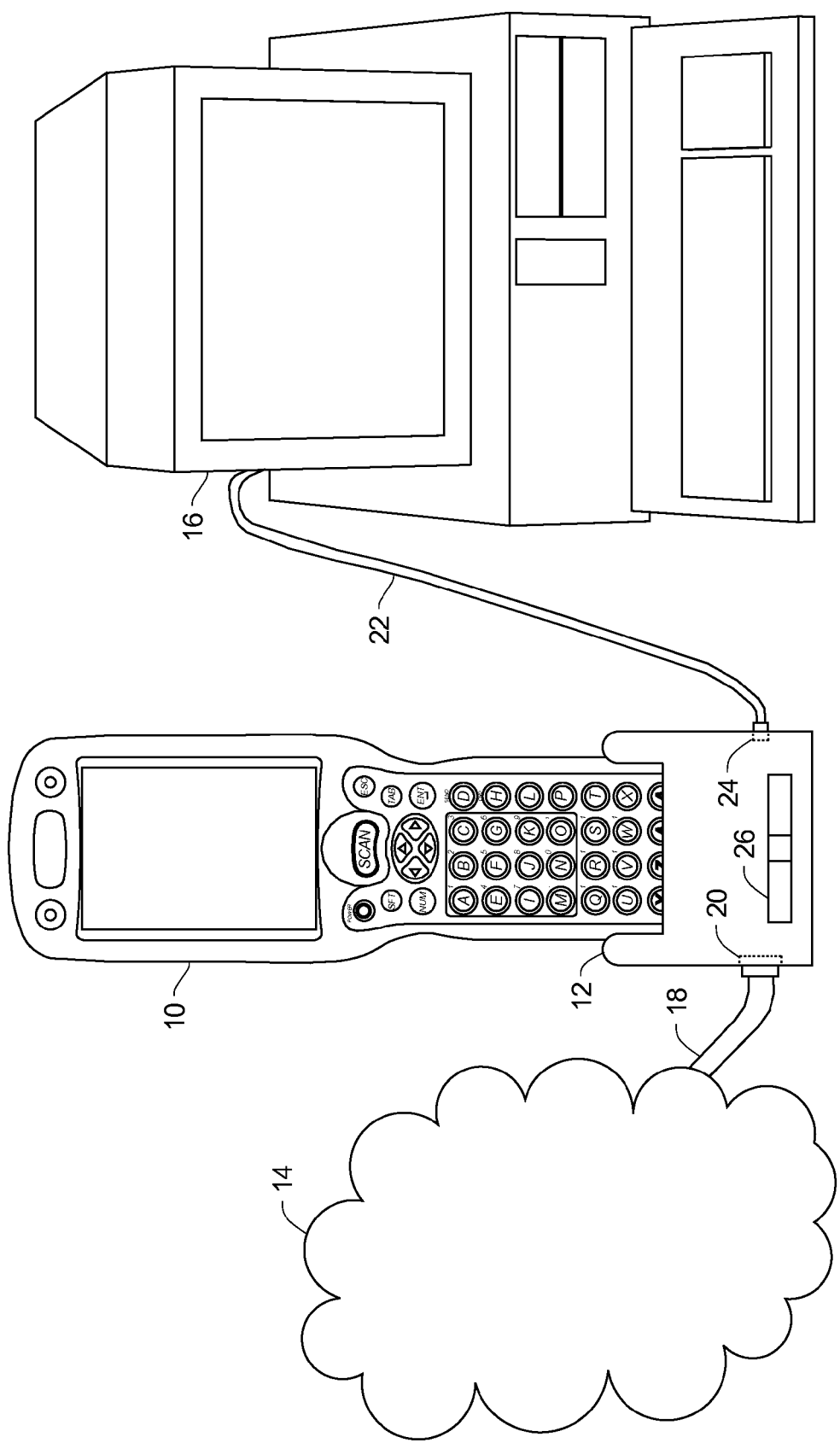
FIG. 1 shows a mobile data terminal (MDT), a docking cradle, an Ethernet local area network (LAN) and a personal computer interconnected together according to at least one embodiment of the present invention.

It will be appreciated that for purposes of clarity and where deemed appropriate, reference numerals have been repeated in the figures to indicate corresponding features. Also, the relative size of various objects in the drawings has in some cases been distorted to more clearly show the invention.

DETAILED DESCRIPTION

Reference will now be made to exemplary embodiments of the invention which are illustrated in the accompanying drawings. This invention, however, may be embodied in various forms and should not be construed as limited to the embodiments set forth herein. Rather, these representative embodiments are described in detail so that this disclosure will be thorough and complete, and will fully convey the scope, structure, operation, functionality, and potential of applicability of the invention to those skilled in the art.

FIG. 1 shows a mobile data terminal (MDT) 10, a docking cradle 12, an Ethernet local area network (LAN) 14 and a personal computer 16 interconnected together according to at least one embodiment of the present invention. An Ethernet cable 18 connects the Ethernet LAN 14 to an Ethernet jack 20 in the docking cradle 12 and a USB cable 22 connects the personal computer 16 to a USB jack 24 inside the docking cradle 12. The personal computer 16 is the USB host terminal to the MDT 10. A manually operated switch 26 on the docking cradle 12 has three positions, a first position for manually selecting the Ethernet connection and a second position for manually selecting the USB connection. A third, auto select position causes the docking cradle to pass data signals back and forth to the MDT 10 through the USB jack 24 if a host USB device is connected to the docking cradle 12, otherwise the docking cradle passes with any data present at the Ethernet jack 20 to and from the MDT 10. The docking cradle 12 connects USB data to and from the USB jack 24 or generated from the Ethernet data at the Ethernet jack 20 and a MDT jack 28 in the docking cradle 12 and shown in FIG. 5.

Figure 2:
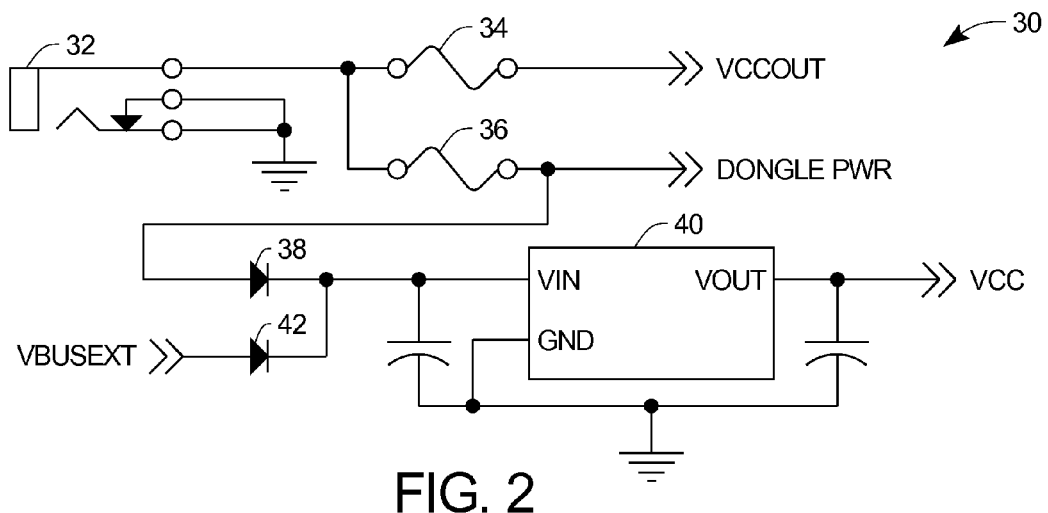
FIG. 2 is a schematic diagram of a power supply section in a docking cradle in accordance with at least one embodiment of the present invention.

Referring to FIG. 2, a schematic diagram of a power supply section 30 of a docking cradle for the MDT 10 in accordance with at least one embodiment of the present invention includes a power supply input jack 32 connected to one terminal of two resettable fuses 34 and 36. The second terminal of fuse 34 provides a supply voltage labeled VCCOUT in FIG. 2, and the second terminal of fuse 36 provides a supply voltage labeled DONGLE PWR in FIG. 2 and is also coupled through a diode 38 to a power supply 40. A USB supply voltage labeled VBUSEXT is coupled through another diode 42 to the power supply 40 which, in turn, provides a regulated output voltage VCC. Thus, the output voltage VCC can be supplied from the input jack 32 or from the USB supply voltage VBUSEXT. Usually an external power supply is plugged into the power supply input jack 32 to not only power the circuits shown in the drawings, but also to recharge a battery in the MDT 10. However, in one embodiment of the present invention the docking cradle 12 can pass signals to and from the MDT 10 using only the USB supply voltage VBUSEXT provided by a USB host device connected to the USB jack 24.

Figure 3:
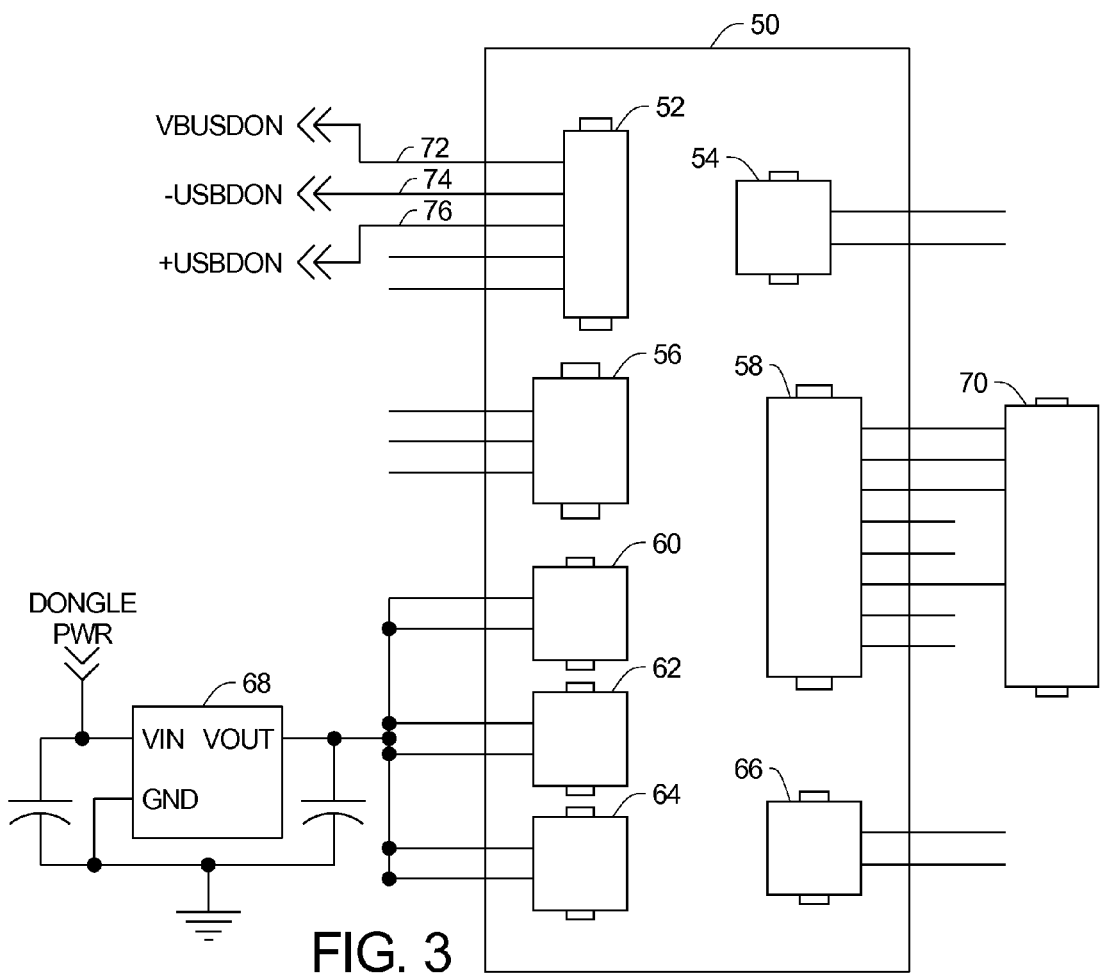
FIG. 3 is a schematic diagram of an Ethernet dongle interface board with a voltage regulator for the interface board and an Ethernet jack in accordance with at least one embodiment of the present invention.

FIG. 3 is a connection diagram for an Ethernet to USB dongle 50 which may be used in the docking cradle. Shown in FIG. 3 are connectors 52, 54, 56, 58, 60, 62, 64, and 66 which connect to mating connectors on the dongle 50 (not shown). Also shown in FIG. 3 is a voltage regulator 68 which receives the voltage supply DONGLE PWR shown in FIG. 2 and provides supply voltage to mating dongle connectors 60, 62, and 64. The Ethernet jack 20 is connected to dongle mating connector 58. The dongle 50 provides an Ethernet terminal for the signals passing through the Ethernet jack 20, including synchronization with the Ethernet connection, and converting Ethernet format signals to and from USB format signals. The dongle 50 also provides the USB supply voltage such that the dongle 50 acts as a USB host. The connectors 54, 56, and 66 may provide signals indicating the status of the dongle 50 such as whether the dongle 50 is in sync with the external Ethernet signal and whether data is passing through the dongle 50. The USB signals to and from the dongle 50 are provided at dongle mating connector 52 which are shown as USB supply voltage VBUSDON on line 72, and USB data signals −USBDON on line 74 and +USBDON on line 76.

Figure 4:
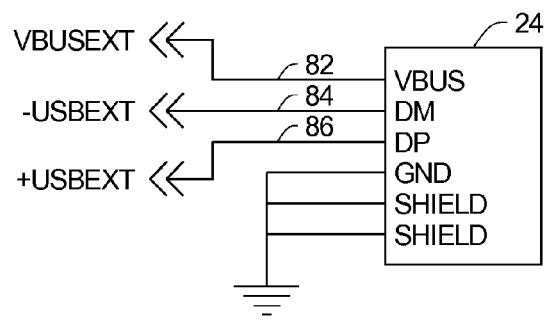
FIG. 4 is a schematic diagram of a USB jack in accordance with at least one embodiment of the present invention.

FIG. 4 is a connection diagram of the USB jack 24 for receiving external USB signals from a USB host such as the personal computer 16 shown in FIG. 1. The positive USB supply voltage VBUS forms the supply voltage VBUSEXT on line 82, and the DM and DP USB signals form the USB data signals −USBEXT on line 84, and +USBEXT on line 86, respectively. The USB ground, GND, and the USB shields in the USB jack 24 are connected to ground.

Figure 5:
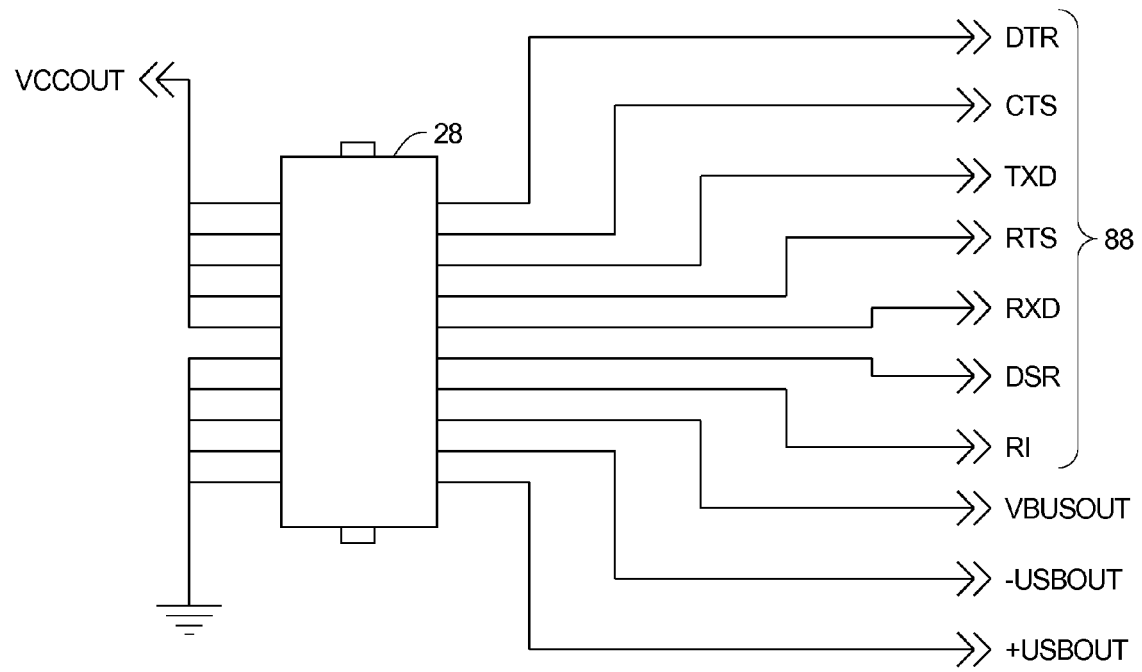
FIG. 5 is a schematic diagram of a MDT connector which mates with a MDT resting in a docking cradle in accordance with at least one embodiment of the present invention.

FIG. 5 is a schematic diagram of the MDT connector 28 which mates with the MDT 10 resting in the docking cradle 12 in accordance with at least one embodiment of the present invention. The MDT connector 28 receives the VCCOUT supply voltage shown in FIG. 2 and USB signals VBUSOUT, −USBOUT, and +USBOUT. In addition serial bus signals 88, if provided to the docking cradle 12 by as external device, are connected to the MDT connector 28 for use by the MDT 10 or other data processing device which can communicate using the serial bus protocol.

Figure 6:
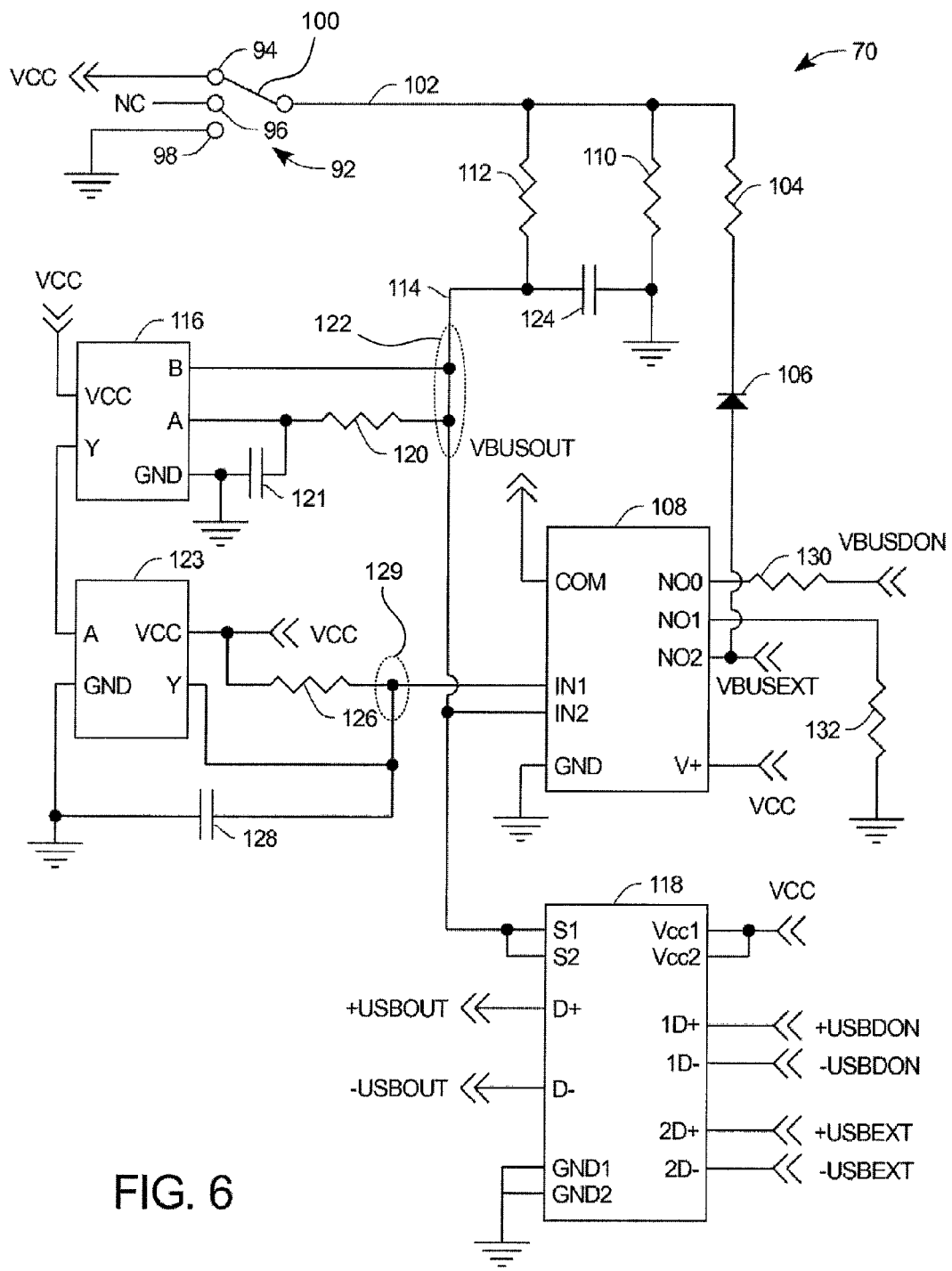
FIG. 6 is a schematic diagram of circuitry for connecting a connector in a docking cradle to signals to and from a USB jack or to and from an Ethernet jack, either manually or automatically, in accordance with at least one embodiment of the present invention.

FIG. 6 is a circuit diagram of the switching portion 70 of the docking cradle which passes the USB signals from either the Ethernet dongle 50 or the USB jack 24 to the MDT connector 28, shown in FIG. 5, for connection with data processing equipment such as the MDT 10. A manual switch 92, corresponding to the manual switch 26 shown in FIG. 1, is a triple pole, single throw switch with a first contact 94 connected to VCC which corresponds to an Ethernet only connection to the MDT 10, a second contact 96 which is not connected and which corresponds to an auto select position of the switch 26, and a third contact 98 connected to ground which corresponds to the USB only connection of the USB jack 24 to the MDT 10. The armature contact 100 is connected to a node 102 which is connected to one end of a resistor 104, the other end of which is connected to the cathode of a diode 106. The anode of diode 106 is connected to an input labeled NO2 of a one-of-four selector IC 108 which is also connected to the signal VBUSEXT from the USB jack 24 shown in FIG. 4. Node 102 is also coupled through a second resistor 110 to ground, and through a third resistor 112 to a node 114.

Node 114 is connected to a first input, labeled B in FIG. 6, of an exclusive OR gate 116, to an input IN2 of the one-of-four selector IC 108, and to inputs S1 and S2 of a one-of-two USB selector IC 118. Node 114 is also coupled through a resistor 120 to the second input, labeled A in FIG. 6, of the exclusive OR gate 116 which, in turn is coupled to ground through a capacitor 121. The common connection of the second input of the exclusive OR gate 116, the resistor 120, and the capacitor 121 forms a node 122. In addition, node 114 is coupled to ground through another capacitor 124. In one embodiment of the present invention the one-of-four selector IC 108 is a TS5A3359, and the one-of-two USB selector IC 118 is a FSUSB11.

The output of the exclusive OR gate 116, labeled Y, is connected to the input, labeled A, of an open drain inverter 123. The output of the open drain inverter 123, labeled Y, is connected to an input IN1 of the one-of-four selector IC 108, and is couple to VCC through a resistor 126 and to ground through a capacitor 128. The common connection of the output of the open drain inverter 123, the input IN1 of the one-of-four selector IC 108, the resistor 126, and the capacitor 128 forms a node 129.

The one-of-four selector IC 108 has two additional inputs, NO0, connected through a resistor 130 to VBUSDON generated by the dongle 50 shown in FIG. 3, and NO1, connected through a resistor 132 to ground. The output, labeled COM, forms the USB supply voltage labeled VBUSOUT that is connected to the MDT jack 28 shown in FIG. 5.

The one-of-two USB selector IC 118 has a set of USB data lines which are connected to one of two sets of selectable USB data lines as determined by the inputs S1 and S2. The first set of selectable USB data lines, labeled 1D+ and 1D− in FIG. 6, are connected to signals labeled +USBDON and −USBDON, respectively, generated by the dongle 50 shown in FIG. 3. The second set of selectable USB data lines, labeled 2D+ and 2D− in FIG. 6, are connected to signals labeled +USBEXT and −USBEXT, respectively, which are USB data connections at the USB jack 24 as shown in FIG. 4. The set of data lines labeled D+ and D− are connected to USB data lines labeled +USBOUT and −USBOUT, respectively, which are connected to the MDT connector 28.

The COM output of the one-of-four selector IC 108 is coupled to none or one of the three inputs NO0, NO1, and NO2 according to the following table where H indicates a high voltage (equivalent to a logical 1 voltage) and L indicates a low voltage (equivalent to a logical 0 voltage):

| IN1 | IN2 | COM to NO and NO to COM |
|-----|-----|------------------------|
| L | L | COM isolated from NO0, NO1, and NO2 |
| L | H | COM = NO1 |
| H | L | COM = NO0 |
| H | H | COM = NO2 |

Thus, the COM terminal and the signal VBUSOUT is isolated or grounded when IN1 is low (low voltage), and connected to VBUSDON or VBUSEXT when IN1 is high (high voltage). When IN1 is high, VBUSOUT is connected to VBUSDON when IN2 is low, and to VBUSEXT when IN2 is high. The USB data lines at the MDT connector 28 are selected from either the USB data lines from the USB jack 24 or the dongle 50 solely by the state of node 114 which is connected to IN2. That is, when node 114 is low (IN2 is low) USB data from the dongle 50 is coupled to the MDT connector 28, and when node 114 is high (IN2 is high) USB data from the USB jack 24 is coupled to the MDT connector 28.

If a user has both an Ethernet connection to the docking cradle 12 and a USB connection from a USB host connected to the USB jack 24, and the MDT 10 is connected to the MDT connector 28 with the MDT 10 having established a USB connection with the dongle 50, and the manual switch 92 is switched to the USB position (contact 98 in FIG. 6) then the MDT 10 does not resync with a USB host connected to the USB jack 24 unless the USB supply voltage to the MDT connector 28 is interrupted long enough for the MDT 10 to reset its USB connection. Without the interruption the MDT 10 will not be in sync with the USB signal from the USB jack 24. The resynchronization problem arises anytime the USB supply voltage to the MDT connector 24 is switched from one of either the USB supply voltage from the dongle 50 or the USB supply voltage from the USB jack 24 to the other of the USB supply voltage from the dongle 50 or the USB supply voltage from the USB jack 24.

Figure 7A:
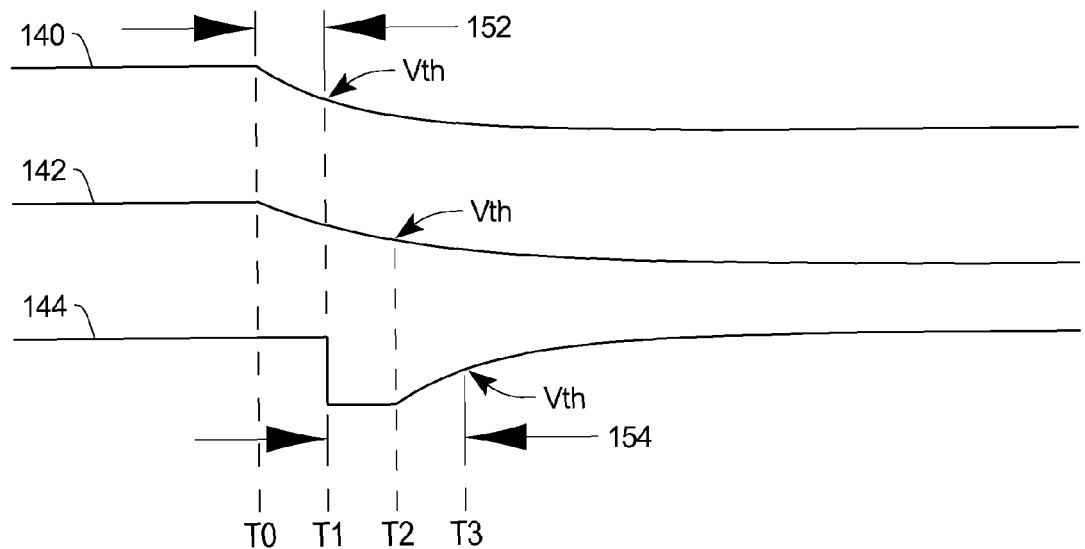
FIGS. 7A and 7B are voltage waveforms of three nodes in the circuitry shown in FIG. 6 during a time when the nodes are changing state.
Figure 7B:
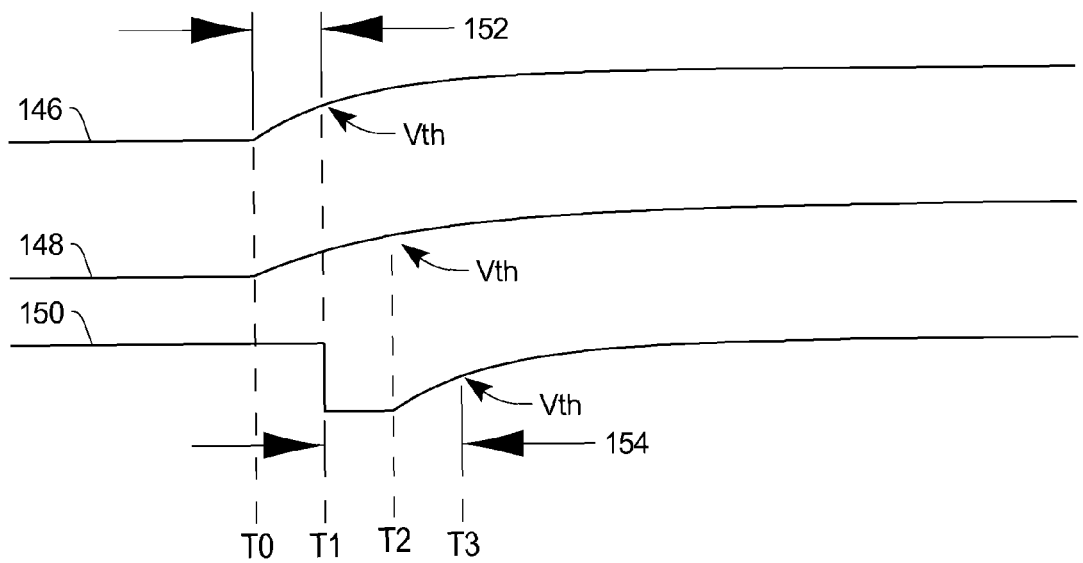

FIGS. 7A and 7B are voltage waveforms of three nodes 114, 122, and 129 in the circuitry shown in FIG. 6 during a time when the nodes are changing state. Node 114, corresponding to waveforms 140 and 146, node 122 corresponding to waveforms 142 and 148, and node 129 corresponding to waveforms 144 and 150. Thus FIG. 7A shows the waveforms present at nodes 114, 122, and 129 when the voltage at node 114 is changing from a high voltage to a low voltage, and FIG. 7B shows the waveforms present at nodes 114, 122, and 129 when the voltage at node 114 is changing from a low voltage to a high voltage. The voltages at nodes 114 and 122, corresponding to waveforms 140, 142, 146, and 148, begin changing at a time T0. At time T1 the voltage at node 114 reaches a threshold voltage, Vth, and the output Y of the exclusive OR gate 116 becomes high, and consequently the output Y of the open drain inverter 123 becomes low which causes the COM terminal of the one-of-four selector IC 108 to either become disconnected from the terminals NO0, NO1, and NO2, or to be grounded depending on the state of node 114 at time T1. Thus the USB supply voltage is no longer present at the MDT connector 28, and the MDT 10 will detect the loss of the USB supply voltage and reset its USB connection if a USB supply voltage was present at the MDT connector 28 prior to time T1. At time T2 the output Y of the exclusive OR gate 116 becomes low, and consequently the output Y of the open drain inverter 123 begins to rise at a rate determined by the resistor 126 and capacitor 128 until the threshold voltage at the IN1 input of the one-of-four selector IC 108 is reached at time T3 when the COM output of the one-of-four selector IC 108 becomes connected to the USB supply voltage from the dongle 50 or the USB jack 24 depending on the state of node 114 at time T3. Thus the time that the USB supply voltage is not present at the MDT connector 28 is at least the delay 152.

For purposes of simplicity the threshold voltages, Vth, shown in FIGS. 7A and 7B are shown as one half of the voltage difference between the high voltage state and the low voltage state. In one embodiment of the present invention, the three resistors 112, 120, and 126 are 100 KΩ, and the capacitors 124, 121, and 128 are 1.0 µf.

Another problem that can arise is that the manual switch 26 in FIG. 1 causes oscillations on node 102 in FIG. 6 when it is switched due to the inherent nature of mechanical switches to bounce. These oscillations, if not filtered, could have a detrimental effect on the USB signals to the MDT 10 when changes are made by a user to the manual switch 26.

The contact bounce occurring in the manual switch 26 is filtered from the rest of the circuitry in FIG. 6 by a first delay stage of resistor 112 in combination with capacitor 124. The time constant of the combination of the resistor 112 and the capacitor 124 is long enough that any bouncing of the contacts ends before the node 114 changes enough to reach the threshold switching voltages of the integrated circuits 108, 116, and 118. Thus there is a delay 154 from the time node 102 switches from a high state to a low state or a low state to a high state and the voltage on node 114 reaches the threshold voltages of the integrated circuits 108, 116, and 118.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

The invention claimed is:

1. Routing circuitry for automatically routing either a first set of USB signals derived from an Ethernet local area network (LAN) at an Ethernet connector or a second set of USB signals derived from a USB host at a USB connector to an output connector which can interface with a data processing device comprising:
   a) USB supply voltage selection circuitry that passes a USB supply voltage from the first set of USB signals, or the second set of USB signals, or isolates the USB supply voltages from the first and second set of USB signals from the output connector in response to two or more first input signals;
   b) USB data selection circuitry that passes USB data signals from the first set of USB signals or the second set of USB signals to the output connector in response to one or more second input signals; and
   c) USB supply voltage detection circuitry that detects if the USB supply voltage from the second set of USB signals is present, and generates the two or more first input signals and the one or more second input signals in response to the detection;
   d) wherein the USB supply voltage detection circuitry generates a first set of first input signals which isolates the USB supply voltages from the first and second set of USB signals from the output connector when there is a change in the USB supply voltage from the second set of USB signals, and later generates a second set of first input signals to pass the USB data signals from the first set of USB signals or the second set of USB signals to the output connector, wherein the USB supply voltage detection circuitry includes a first node that changes from one of a high voltage state or low voltage state to the other of the high voltage state or low voltage state if there is a change in the USB supply voltage present on the USB connector, said first node coupled to said first and second set of input signals, wherein the USB supply voltage detection circuitry includes a delay circuit with an input coupled to the first node and an output coupled to a first of said first input signals, wherein the delay circuit includes delay stages wherein an output of a first delay stage is a second of the first input signals and the one or more second input signals, and an output of a last delay stage is the first of said first input signals.

2. The routing circuitry set forth in claim 1 wherein the USB supply voltage at the output connector is isolated from both of the USB supply voltages of the first and second USB signals if the output of the last delay stage is at one or a high or low voltage level.

3. The routing circuitry set forth in claim 1 wherein the first stage of the delay circuit filters contact bouncing that may occur when the manual switch is changed from one position to another.

4. The routing circuitry set forth in claim 1 wherein the delay circuit comprises a plurality of RC delay stages.

5. Routing circuitry for routing either a first set of USB signals derived from an Ethernet local area network (LAN) at an Ethernet connector or a second set of USB signals derived from a USB host at a USB connector to an output connector which can interface with a data processing device comprising:
   a) USB supply voltage selection circuitry that passes a USB supply voltage from the first set of USB signals, or the second set of USB signals, or isolates the USB supply voltages from the first and second set of USB signals from the output connector in response to two or more first input signals;
   b) USB data selection circuitry that passes USB data signals from the first set of USB signals or the second set of USB signals to the output connector in response to one or more second input signals; and
   c) USB supply voltage detection circuitry that detects if the USB supply voltage to the output connector is from one of the first or second set of USB signals, and generates the two or more first input signals and the one or more second input signals in response to the detection;
   d) wherein the USB supply voltage detection circuitry generates a first set of first input signals which isolates the USB supply voltages from the first and second set of USB signals from the output connector when the USB supply voltage from one of the first and second set of USB signals changes to the other of the first and second set of USB signals, and later generates a second set of first input signals to pass the USB data signals from the other of the first set of USB signals or second set of USB signals to the output connector, wherein the USB supply voltage detection circuitry includes a first node that changes from one of a high voltage state or low voltage state to the other of the high voltage state or low voltage state if a manual switch is in a first position and if there is a change in the USB supply voltage present on the USB connector, said first node coupled to said first and second set of input signals, and does not change voltage states irregardless of the USB supply voltage present on the USB connector if the manual switch is not in the first position, wherein the USB supply voltage detection circuitry includes a delay circuit with an input coupled to the first node and an output coupled to a first of said first input signals, wherein the delay circuit includes delay stages wherein an output of a first delay stage is a second of the first input signals and the one or more second input signals, and an output of a last delay stage is the first of said first input signals.

6. The routing circuitry set forth in claim 5 wherein the USB supply voltage at the output connector is isolated from both of the USB supply voltages of the first and second USB signals if the output of the last delay stage is at one or a high or low voltage level.

7. The routing circuitry set forth in claim 5 wherein the first stage of the delay circuit filters contact bouncing that may occur when the manual switch is changed from one position to another.

8. The routing circuitry set forth in claim 5 wherein the delay circuit comprises a plurality of RC delay stages.

* * * * *